(12) United States Patent
Lu et al.

(10) Patent No.: US 7,952,644 B2
(45) Date of Patent: May 31, 2011

(54) ADAPTIVE DE-INTERLACER AND METHOD THEREOF

(75) Inventors: Yi Pin Lu, Tainan County (TW); Ling Shiou Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1023 days.

(21) Appl. No.: 11/746,342

(22) Filed: May 9, 2007

(65) Prior Publication Data

US 2008/0278623 A1 Nov. 13, 2008

(51) Int. Cl.
*H04N 7/01* (2006.01)
*H04N 11/20* (2006.01)

(52) U.S. Cl. .......................................... 348/452; 348/451

(58) Field of Classification Search .................. 348/448, 348/441, 451, 452, 458, 459; H04N 7/01, H04N 11/20

See application file for complete search history.

(56) References Cited

U.S. PATENT DOCUMENTS

| | | | | |
|---|---|---|---|---|
| 7,142,247 B2 * | 11/2006 | Jung | | 348/452 |
| 2004/0207753 A1 * | 10/2004 | Jung | | 348/452 |
| 2005/0046742 A1 * | 3/2005 | Saito | | 348/452 |

* cited by examiner

*Primary Examiner* — Sherrie Hsia
(74) *Attorney, Agent, or Firm* — WPAT, P.C.; Anthony King

(57) ABSTRACT

An adaptive de-interlacer can convert an interlaced video signal into a progressive video signal, and comprises a motion detector, an intra-field interpolator, an inter-field interpolator, a motion aliasing artifact detector and a blending unit. The motion detector generates an alpha value for each interpolated pixel in a current field of the interlaced video signal based on successive fields of the interlaced video signal. The intra-field interpolator outputs an intra-field interpolated pixel based on the current field, and the inter-field interpolator also outputs an inter-field interpolated pixel based on the successive fields. Afterward, the motion aliasing artifact detector detects whether the interpolated pixel is located in a motion aliasing area. The blending unit receives and mixes the intra-field interpolated pixel and inter-field interpolated pixel based on the alpha value from the motion detector and the detection result from the motion aliasing artifact detector so as to determine the interpolated pixel.

14 Claims, 3 Drawing Sheets

ADAPTIVE DE-INTERLACER AND METHOD THEREOF

BACKGROUND OF THE INVENTION

1. Field of the Invention

The present invention relates to video processing, and more particularly relates to adaptive de-interlacing capable of detecting motion aliasing artifacts to control alpha blending in the adaptive de-interlacing.

2. Description of the Related Art

Several known de-interlacing methods can convert an interlaced video signal to a progressive video signal. An interlaced video signal includes a succession of fields, each field including a plurality of scanning lines. Two successive fields of an interlaced video signal can define a frame where the first field includes the odd scanning lines (e.g., scanning lines 1, 3, 5, 7, etc.) and the second field includes the even scanning lines (e.g., 2, 4, 6, 8, etc.).

A de-interlacing method generates a line of interpolated pixels between every two successive lines of a field. Examples of known de-interlacing methods of de-interlacing an interlaced video signal include inter-field interpolation (known as temporal interpolation) and intra-field interpolation (known as spatial interpolation). In an area with little or no motion, inter-field interpolation is preferred. By contrast, in an area with high motion, intra-field interpolation is preferred.

An alternative form of de-interlacing employs alpha blending, which attempts to mix both inter-field interpolation and intra-field interpolation based on motion in a picture. Such de-interlacing methods often depend upon vast computational resources to operate effectively, and still can produce mismatching errors when motion aliasing artifacts can be found in successive fields, that is likely to produce zigzag patterns on the output progressive frame.

In view of the foregoing, it can be appreciated that a substantial need exists for an adaptive de-interlacer and method thereof that can advantageously detect motion aliasing artifacts to control alpha blending in the adaptive de-interlacing.

SUMMARY OF THE INVENTION

An objective of the present invention is to provide an adaptive de-interlacer and an adaptive de-interlacer method capable of detecting motion aliasing artifacts to control alpha blending in the adaptive de-interlacing.

In order to achieve the objectives, the present invention discloses an adaptive de-interlacer for converting an interlaced video signal into a progressive video signal comprising a motion detector, an intra-field interpolator, an inter-field interpolator, a motion aliasing artifact detector and a blending unit. The motion detector generates an alpha value for each interpolated pixel in a current field of the interlaced video signal based on successive fields of the interlaced video signal. The intra-field interpolator outputs an intra-field interpolated pixel based on the current field, and the inter-field interpolator outputs an inter-field interpolated pixel based on the successive fields. Afterward, the motion aliasing artifact detector detects whether the interpolated pixel is located in a motion aliasing area. The blending unit receives and mixes the intra-field interpolated pixel and inter-field interpolated pixel based on the alpha value from the motion detector and the detection result from the motion aliasing artifact detector so as to determine the interpolated pixel.

Furthermore, the present invention provides an adaptive de-interlacer method for converting an interlaced video signal into a progressive video signal. An alpha value is generated for each interpolated pixel in a current field of the interlaced video signal based on successive fields of the interlaced video signal. An intra-field interpolated pixel is outputted based on the current field, and an inter-field interpolated pixel is also outputted based on the successive fields. Afterward, whether the interpolated pixel is located in a motion aliasing area is detected. Final, the intra-field interpolated pixel and inter-field interpolated pixel are mixed based on the alpha value and the detection so as to determine the interpolated pixel.

BRIEF DESCRIPTION OF THE DRAWINGS

The invention will be described according to the appended drawings in which.

DETAILED DESCRIPTION OF THE INVENTION

FIGS. 1(a)-1(c) show successive fields of an interlaced video signal used in accordance with an embodiment of the present invention. The interlaced video signal has a succession of fields. The apative de-interlacing method in accordance with embodiments of the present invention can generate a progressive frame by including lines of interpolated pixels, e.g. the interpolated pixel $Z_0$, based in part on pixels from a previous field $f(T-1)$, a current field $f(T)$ and a next field $f(T+1)$ of the interlaced video signal. The current field $f(T)$ has a pixel $Z_0^A$ of a scanning line A and a pixel $Z_0^C$ of a scanning line C. The pixels $Z_0^A$ and $Z_0^C$ are the pixels immediately above and below the interpolated pixel $Z_0$, respectively. A pixel $Z_0^{BH}$ of the scanning line BH is the next pixel in the next field $f(T+1)$ at the same spatial location as the interpolated pixel $Z_0$, and a pixel $Z_0^{GH}$ of the scanning line GH is immediately above the next pixel $Z_0^{BH}$. A pixel $Z_0^{BL}$ of the scanning line BL is the previous pixel in the previous field $f(T-1)$ at the same spatial location as the interpolated pixel $Z_0$, and a pixel $Z_0^{GL}$ of the scanning line GL is immediately above the previous pixel $Z_0^{BL}$.

Figure 2:
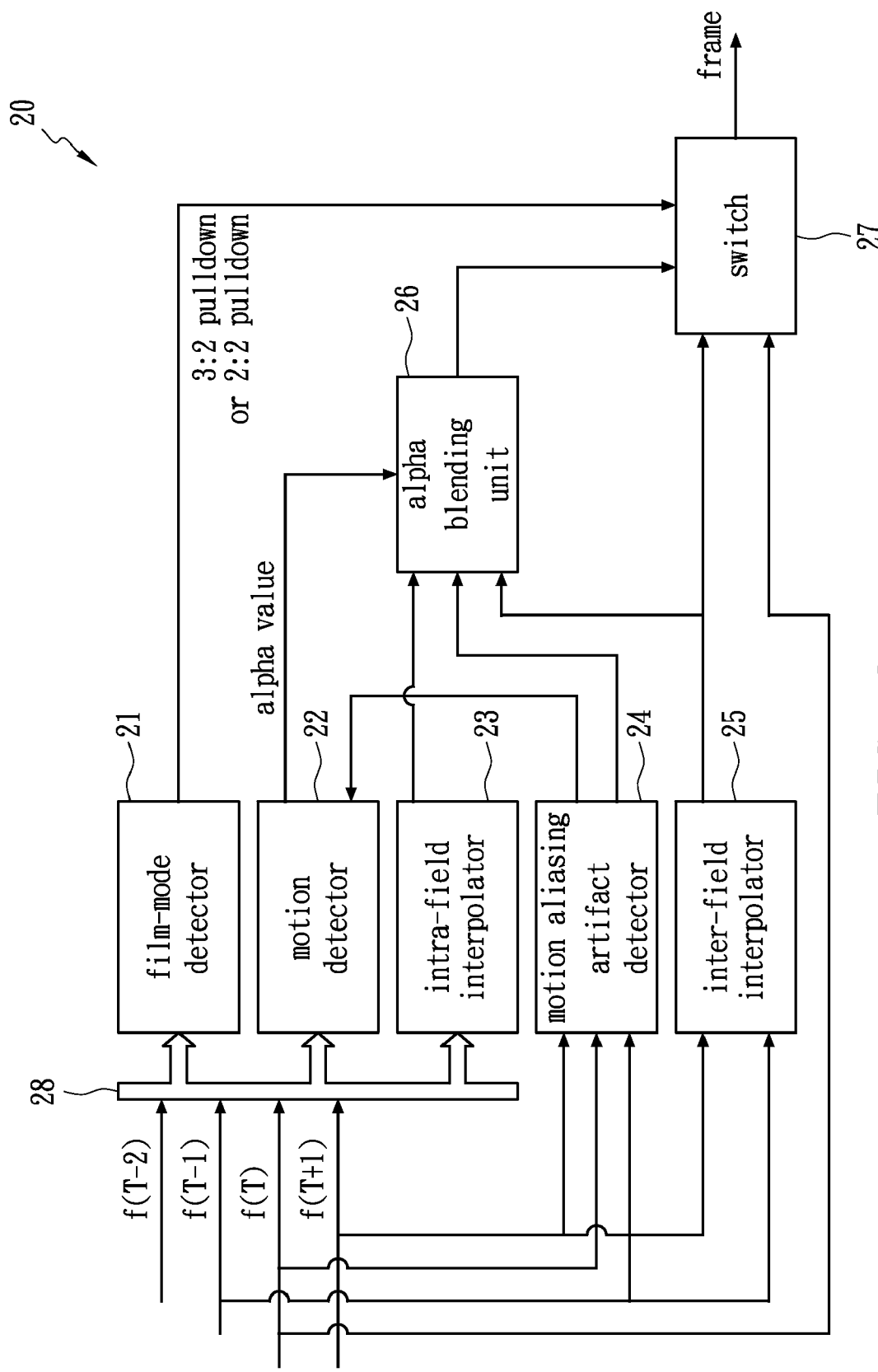
FIG. 2 is a function block diagram of an adaptive de-interlacer in accordance with an embodiment of the present invention.

FIG. 2 is a function block diagram of an adaptive de-interlacer in accordance with an embodiment of the present invention. As shown in FIG. 2, the adaptive de-interlacer 20 comprises a film-mode detector 21, a motion detector 22, an intra-field interpolator 23, a motion aliasing artifact detector 24, an inter-field interpolator 25, an alpha blending unit 26 and a soft switch 27. The motion detector 22 can generate an alpha value (or a motion value) for each interpolated pixel, e.g. the interpolated pixel $Z_0$ based on successive fields $f(T-2)$, $f(T-1)$, $f(T)$ and $f(T+1)$ of the interlaced video signal and the detection result from the motion aliasing artifact detector 24, which will be described in more details below. The intra-field interpolator 23 also receives data for the current field $f(T)$ and yields an intra-field interpolated pixel. Similarly, the inter-field interpolator outputs an inter-field interpolated pixel on the basis of data from the fields $f(T-1)$ and $f(T+1)$.

The motion aliasing artifact detector 24 detects whether the interpolated pixel $Z_0$ in the current field $f(T)$ is located in a motion aliasing area, and outputs the detection result to the motion detector 22. Furthermore, the alpha blending unit 26 receives the detection result from the motion aliasing artifact detector 24, and mixes the intra-field interpolated pixel and inter-field interpolated pixel based on not only the alpha value but also the detection result from the motion aliasing artifact detector 24, such that mismatching errors due to motion aliasing artifacts can be minimized with proper compensation. Generally, pixels located in a motion aliasing area may be incorrectly identified as pixels demanding inter-field interpolation. Consequentially, with the motion aliasing artifact detection, the de-interlacer 20 can correctly control the alpha blending unit 26 to ignore or de-emphasize the inter-field interpolated pixel of the interpolated pixel $Z_0$ when located in a motion aliasing area. The film-mode detector 312 detects whether the interlaced video signal is in film mode based on the successive fields f(T−2), f(T−1), f(T) and f(T+1), so as to perform 3:2 or 2:2 pulldown when necessary (not shown in FIG. 2). Finally, the soft switch 27 outputs a progressive frame by combining the current field f(T) to an interpolated filed generated by the intra-field interpolator 23 and/or the inter-field interpolator 25 in view of the alpha value from the alpha blending unit 26 and the detection result from the motion aliasing artifact detector 24, or by combining the current field(T) to the 3:2 or 2:2 pulldown when the interlaced video signal is in film mode.

Figure 1:
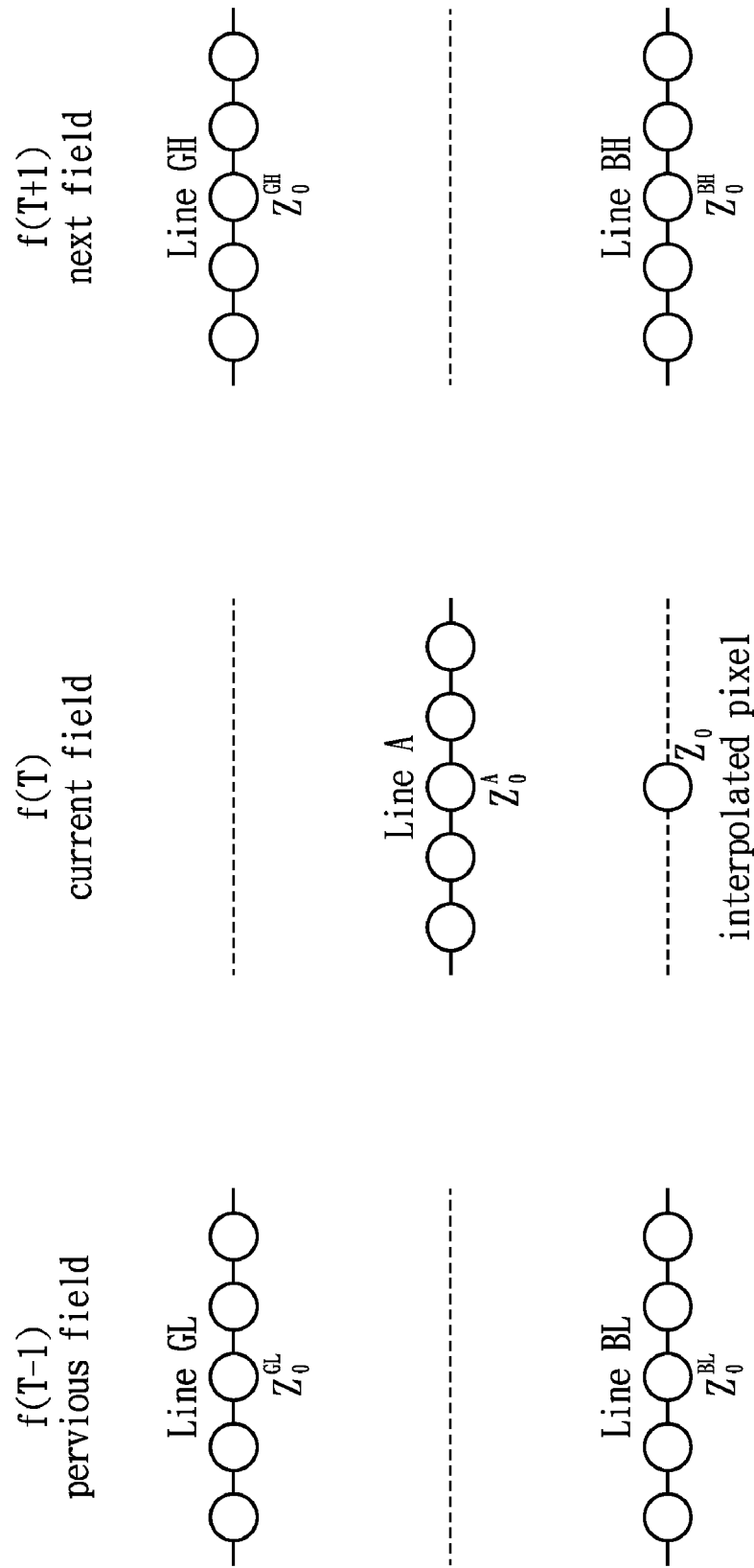
FIGS. 1(a)-1(c) show successive fields of an interlaced video signal used in accordance with an embodiment of the present invention.
Figure 3:
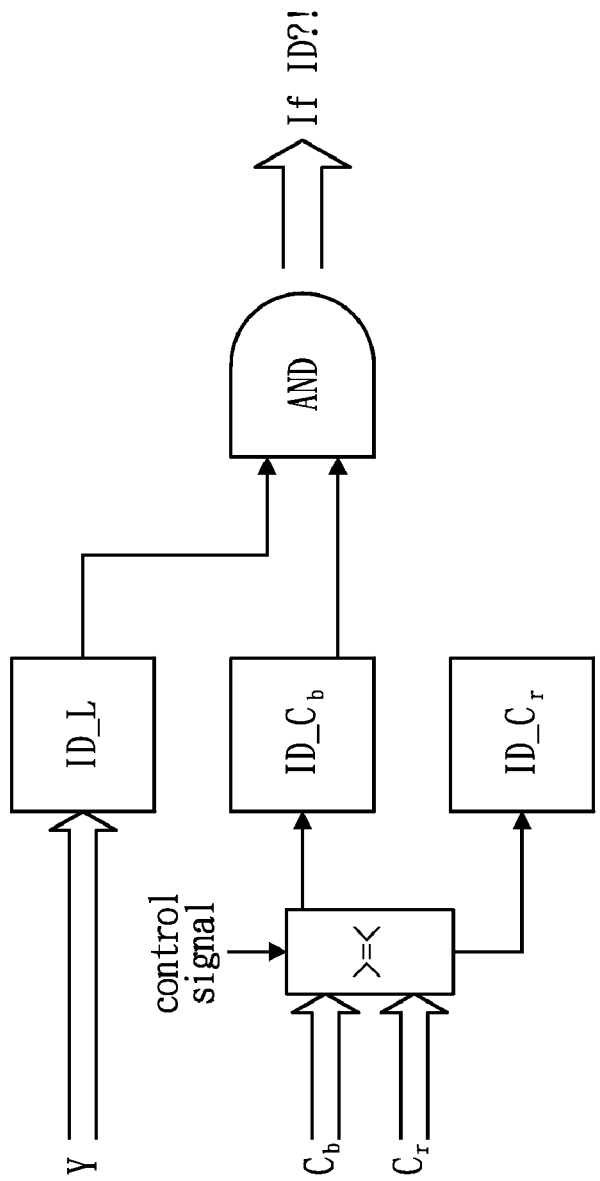
FIG. 3 is a function block diagram showing a motion aliasing artifact detector in accordance with an embodiment of the present invention.

FIG. 3 is a function block diagram showing a motion aliasing artifact detector in accordance with an embodiment of the present invention. Exemplified with the interpolated pixel $Z_0$, as shown in FIG. 1, whether or not the interpolated pixel $Z_0$ between the scanning lines A and C is located in a motion aliasing area could be determined based on one luminance index ID_L and two chrominance indexes ID_Cb and ID_Cr, which may be defined below:

ID=ID_L&ID_Cb&ID_Cr where ID indicates whether or not the interpolated pixel $Z_0$ is located in a motion aliasing area, and ID_L, ID_Cb and ID_Cr respectively indicates the luminance index and two chrominance indexes.

The luminance index ID_L could be defined below:

ID_L=ID_L(T+1)&ID_L(T−1)

where ID_L(T+1) and ID_L(T−1) are respectively defined below:

ID_L(T+1)=ID_Lup(T+1)&ID_Ldn(T+1)&sign($LZ_0^A$−$LZ_0^{BH}$)=sign($LZ_0^C$−$LZ_0^{BH}$)

ID_L(T−1)=ID_Lup(T−1)&ID_Ldn(T−1)&sign($LZ_0^A$−$LZ_0^{BL}$)=sign($LZ_0^C$−$LZ_0^{BL}$)

where ID_Lup(T+1), ID_Ldn(T+1), ID_Lup(T−1) and ID_Ldn(T−1) may be each defined below:

ID_Lup(T+1)=abs($LZ_0^{GH}$−$LZ_0^{BH}$)*L1<abs($LZ_0^A$−$LZ_0^{BH}$)&abs($LZ_0^A$−$LZ_0^{BH}$)<>0

ID_Ldn(T+1)=abs($LZ_0^A$−$LZ_0^C$)*L1<abs($LZ_0^{BH}$−$LZ_0^C$)& abs($LZ_0^{BH}$−$LZ_0^C$)<>0

ID_Lup(T−1)=abs($LZ_0^{GL}$−$LZ_0^{BL}$)*L1<abs($LZ_0^A$−$LZ_0^{BL}$)&abs($LZ_0^A$−$LZ_0^{BL}$)<>0

ID_Ldn(T−1)=abs($LZ_0^A$−$LZ_0^C$)*L1<abs($LZ_0^{BL}$−$LZ_0^C$)& abs($LZ_0^{BL}$−$LZ_0^C$)<>0 where L1 is a constant ranging from 1 to 2, and $LZ_0^A$, $LZ_0^C$, $LZ_0^{BH}$, $LZ_0^{BL}$, $LZ_0^{GH}$ and $LZ_0^{GL}$ are luminance for the corresponding pixels $Z_0^A$, $Z_0^C$, $Z_0^{BH}$, $Z_0^{BL}$, $Z_0^{GH}$ and $Z_0^{GL}$.

The chrominance indexes ID_C (ID_Cb and ID_Cr) could be defined below:

(1) If the chrominance average of the pixels $Z_0^A$ and $Z_0^C$ is not averaged around 128, that is, the interpolated pixel $Z_0$ is not about black or white, the chrominance indexes ID_C (ID_Cb and ID_Cr) may be set to zero (0).

(2) Otherwise, if the chrominance average of the pixels $Z_0^A$ and $Z_0^C$ is averaged around 128, the chrominance indexes ID_C (ID_Cb and ID_Cr) could be defined below:

ID_C=ID_C(T+1)&ID_C(T−1)

where ID_C(T+1) and ID_C(T−1) are respectively defined below:

ID_C(T+1)=ID_Cup(T+1)&ID_Cdn(T+1)&sign($CZ_0^A$−$CZ_0^{BH}$)=sign($CZ_0^C$−$CZ_0^{BH}$)

ID_C(T−1)=ID_Cup(T−1)&ID_Cdn(T−1)&sign($CZ_0^A$−$CZ_0^{BL}$)=sign($CZ_0^C$−$CZ_0^{BL}$)

where ID_Cup(T+1), ID_Cdn(T+1), ID_Cup(T−1) and ID_Cdn(T−1) may be each defined below:

ID_Cup(T+1)=abs($CZ_0^{GH}$−$CZ_0^{BH}$)*L2<abs($CZ_0^A$−$CZ_0^{BH}$)&abs($CZ_0^A$−$CZ_0^{BH}$)<>0

ID_Cdn(T+1)=abs($CZ_0^A$−$CZ_0^C$)*L2<abs($CZ_0^{BH}$−$CZ_0^C$)& abs($CZ_0^{BH}$−$CZ_0^C$)<>0

ID_Cup(T−1)=abs($CZ_0^{GL}$−$CZ_0^{BL}$)*L2<abs($CZ_0^A$−$CZ_0^{BL}$)&abs($CZ_0^A$−$CZ_0^{BL}$)<>0

ID_Cdn(T−1)=abs($CZ_0^A$−$CZ_0^C$)*L2<abs($CZ_0^{BL}$−$CZ_0^C$)& abs($CZ_0^{BL}$−$CZ_0^C$)<>0 where L2 is a constant ranging from 0.5 to 1, and $CZ_0^A$, $CZ_0^C$, $CZ_0^{BH}$, $CZ_0^{BL}$, $CZ_0^{GH}$ and $CZ_0^{GL}$ are chrominance (Cb, Cr) for the corresponding pixels $Z_0^A$, $Z_0^C$, $Z_0^{BH}$, $Z_0^{BL}$, $Z_0^{GH}$ and $Z_0^{GL}$.

As shown above, the interpolated pixel $Z_0$ is determined to be located in a motion aliasing area only if the luminance index ID_L and chrominance indexes ID_Cb, ID_Cr are respectively set to one (1), that is, the interpolated pixel $Z_0$ is located in a motion aliasing area in terms of both luminance or chrominance.

With the detection result, by reference to FIG. 2, the de-interlacer 20 can correctly control the alpha blending unit 26 to ignore or de-emphasize the inter-field interpolation when located in a motion aliasing area, thus improving the mismatching errors due to motion aliasing artifacts.

The above-described embodiments of the present invention are intended to be illustrative only. Numerous alternative embodiments may be devised by persons skilled in the art without departing from the scope of the following claims.

What is claimed is:

1. An adaptive de-interlacer converting an interlaced video signal into a progressive video signal, comprising:
   a motion detector generating an alpha value for each interpolated pixel in a current field of the interlaced video signal based on successive fields of the interlaced video signal;
   an intra-field interpolator outputting an intra-field interpolated pixel based on the current field;
   an inter-field interpolator outputting an inter-field interpolated pixel based on the successive fields;
   a motion aliasing artifact detector detecting whether the interpolated pixel is located in a motion aliasing area; and
   a blending unit receiving and mixing the intra-field interpolated pixel and inter-field interpolated pixel based on the alpha value from the motion detector and the detection result from the motion aliasing artifact detector so as to determine the interpolated pixel.

2. The adaptive de-interlacer of claim 1, further comprising a switch outputting a progressive frame based on data from the alpha blending unit and the current field.

3. The adaptive de-interlacer of claim 2, further comprising a film-mode detector detecting whether or not the interlaced video signal is in film mode so as to perform 3:2 or 2:2 pulldown.

4. The adaptive de-interlacer of claim 3, wherein the switch combines the current field and its 3:2 or 2:2 pulldown to output the progressive frame when the interlaced video signal is in film mode.

5. The adaptive de-interlacer of claim 1, wherein the motion aliasing artifact detector compares luminance differences and chrominance differences between pixels of the successive fields spatially corresponding to or adjacent to the interpolated pixel to determine whether the interpolated pixel is located in a motion aliasing area.

6. The adaptive de-interlacer of claim 5, wherein the motion aliasing artifact detector averages chrominance of pixels in a current field adjacent to the interpolated pixel and compares chrominance differences between pixels of the successive fields spatially corresponding to or adjacent to the interpolated pixel only if the average is around black or white.

7. The adaptive motion de-interlacer of claim 1, wherein the blending unit is controlled to ignore or de-emphasize the inter-field interpolated pixel when the motion aliasing artifact detector confirms that the interpolated pixel is located in the motion aliasing area.

8. An adaptive de-interlacing method converting an interlaced video signal into a progressive video signal, comprising:
   generating an alpha value for each interpolated pixel in a current field of the interlaced video signal based on successive fields of the interlaced video signal;
   outputting an intra-field interpolated pixel based on the current field;
   outputting an inter-field interpolated pixel based on the successive fields;
   detecting whether the interpolated pixel is located in a motion aliasing area; and
   mixing the intra-field interpolated pixel and inter-field interpolated pixel based on the alpha value and the detection result from the step of detecting so as to determine the interpolated pixel.

9. The adaptive de-interlacing method of claim 8, further comprising:
   outputting a progressive frame based on the mixed data and the current field.

10. The adaptive de-interlacing method of claim 9, further comprising:
   detecting whether or not the interlaced video signal is in film mode so as to perform 3:2 or 2:2 pulldown.

11. The adaptive de-interlacing method of claim 10, wherein the step of outputting the progressive frame comprises:
   combining the current field and its 3:2 or 2:2 pulldown when the interlaced video signal is in film mode.

12. The adaptive de-interlacing method of claim 8, wherein the step of detecting whether the interpolated pixel is located in a motion aliasing area comprises:
   comparing luminance differences and chrominance differences between pixels of the successive fields spatially corresponding to or adjacent to the interpolated pixel to determine whether the interpolated pixel is located in a motion aliasing area.

13. The adaptive de-interlacing method of claim 12, wherein the step of detecting whether the interpolated pixel is located in a motion aliasing area comprises:
   averaging chrominance of pixels in a current field adjacent to the interpolated pixel and comparing chrominance differences between pixels of the successive fields spatially corresponding to or adjacent to the interpolated pixel only if the average is around black or white.

14. The adaptive motion de-interlacing method of claim 8, wherein the mixing step comprises:
   ignoring or de-emphasizing the inter-field interpolated pixel when the step of detecting whether the interpolated pixel is located in a motion aliasing area confirms that the interpolated pixel is located in the motion aliasing area.

* * * * *